Dec. 12, 1944.　　　G. B. POLLOCK　　　2,364,652
CAMERA CONSTRUCTION
Filed June 16, 1941　　　8 Sheets-Sheet 1
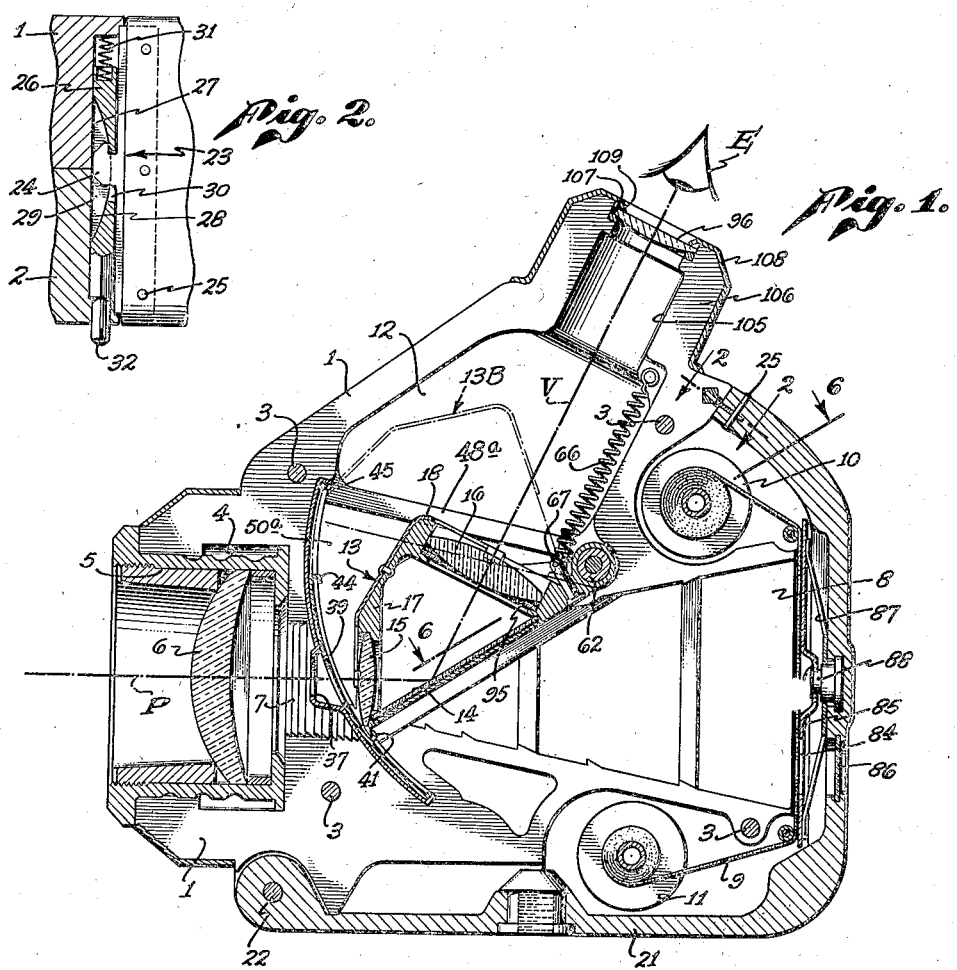
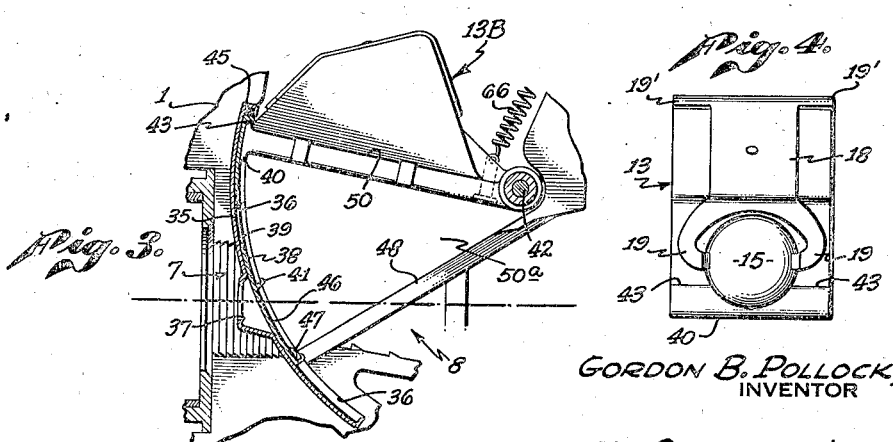
GORDON B. POLLOCK,
INVENTOR
BY
ATTORNEY.

GORDON B. POLLOCK,
INVENTOR

BY
ATTORNEY.

Dec. 12, 1944. G. B. POLLOCK 2,364,652
CAMERA CONSTRUCTION
Filed June 16, 1941 8 Sheets-Sheet 3

GORDON B. POLLOCK,
INVENTOR

BY *Alfred W. Knight*
ATTORNEY.

Dec. 12, 1944. G. B. POLLOCK 2,364,652
CAMERA CONSTRUCTION
Filed June 16, 1941 8 Sheets-Sheet 4
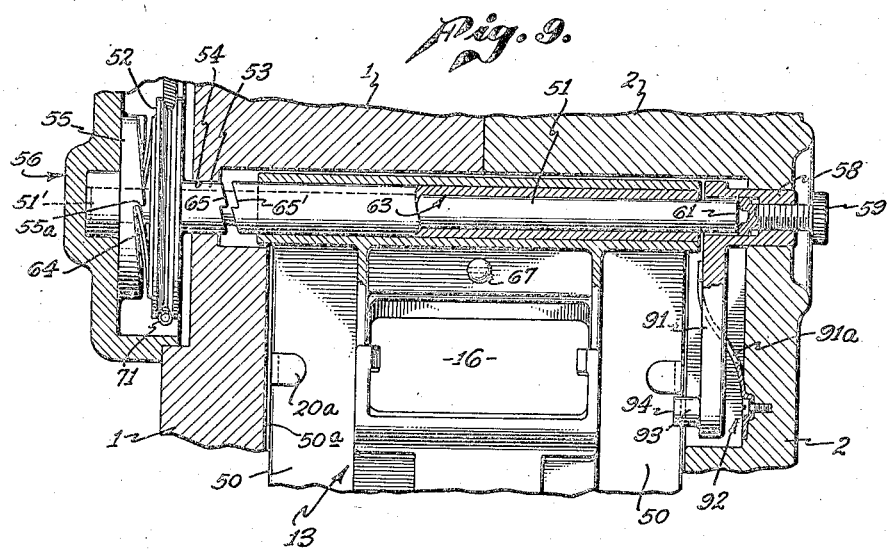
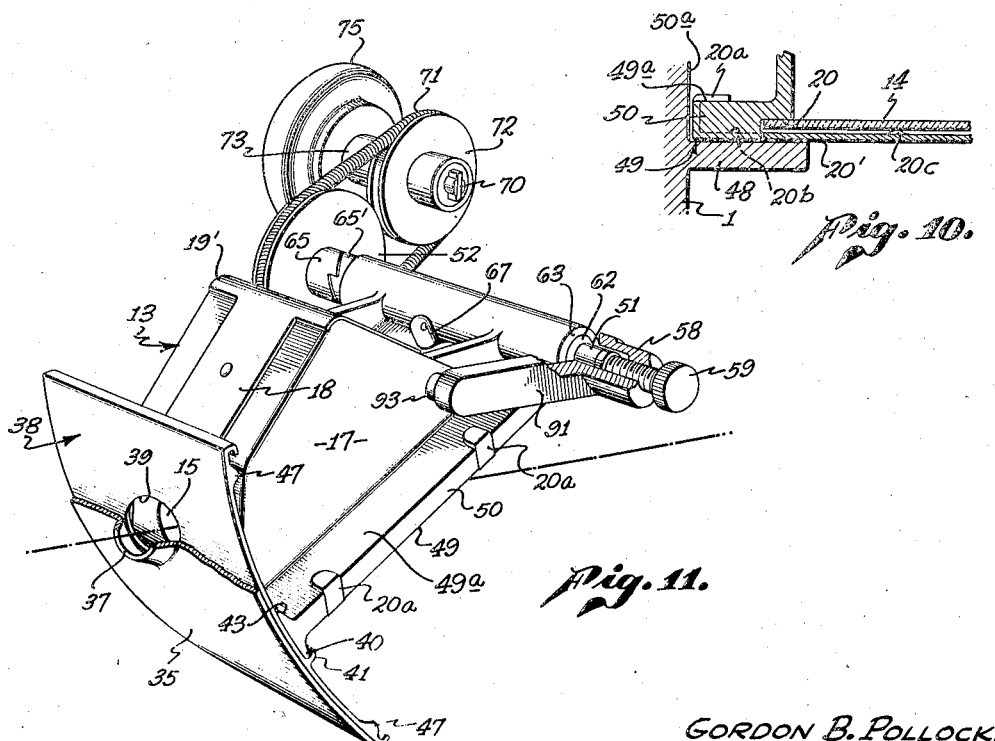
GORDON B. POLLOCK,
INVENTOR
BY
ATTORNEY.

Dec. 12, 1944.　　　G. B. POLLOCK　　　2,364,652
CAMERA CONSTRUCTION
Filed June 16, 1941　　　8 Sheets-Sheet 5

GORDON B. POLLOCK,
INVENTOR

BY
ATTORNEY.

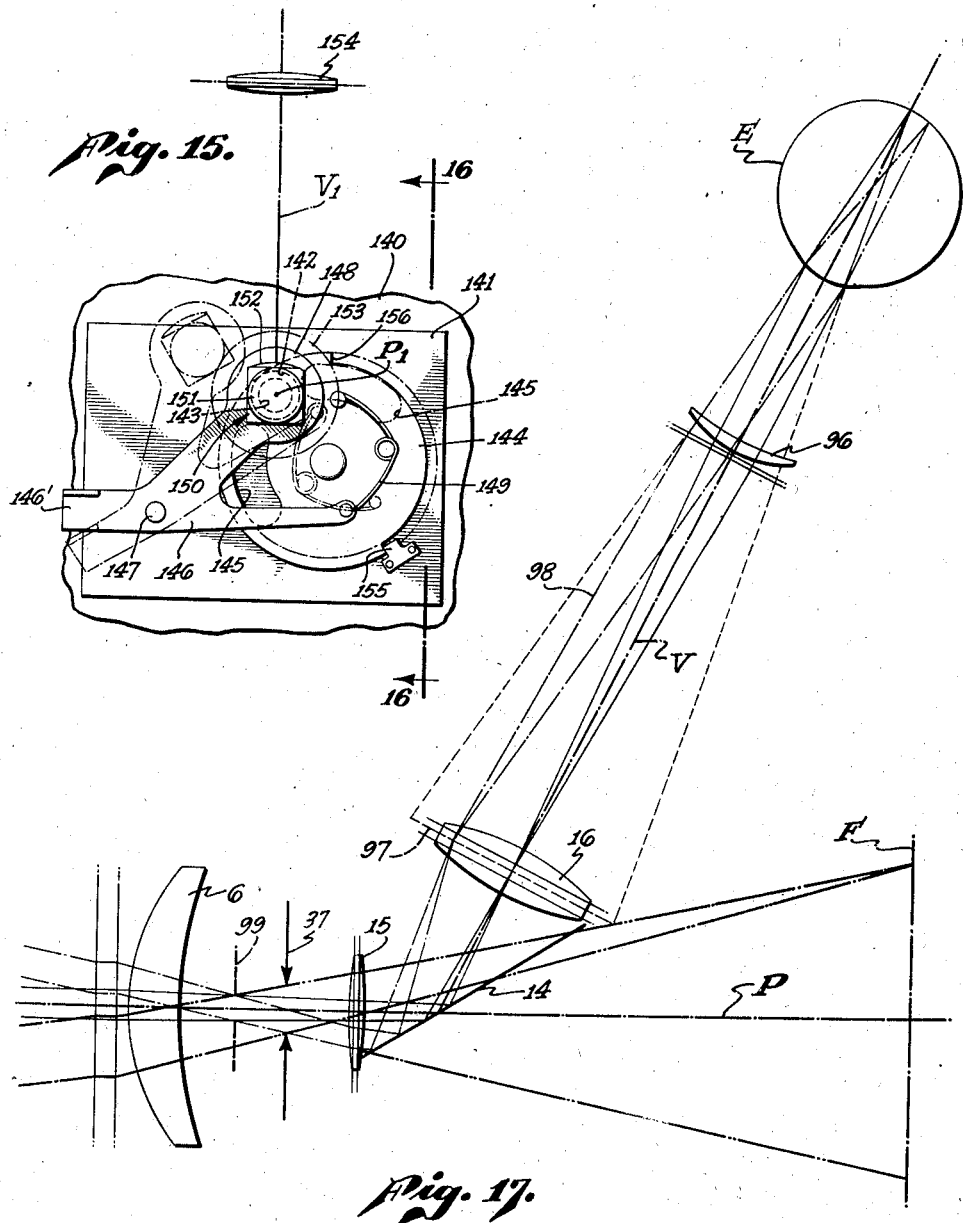

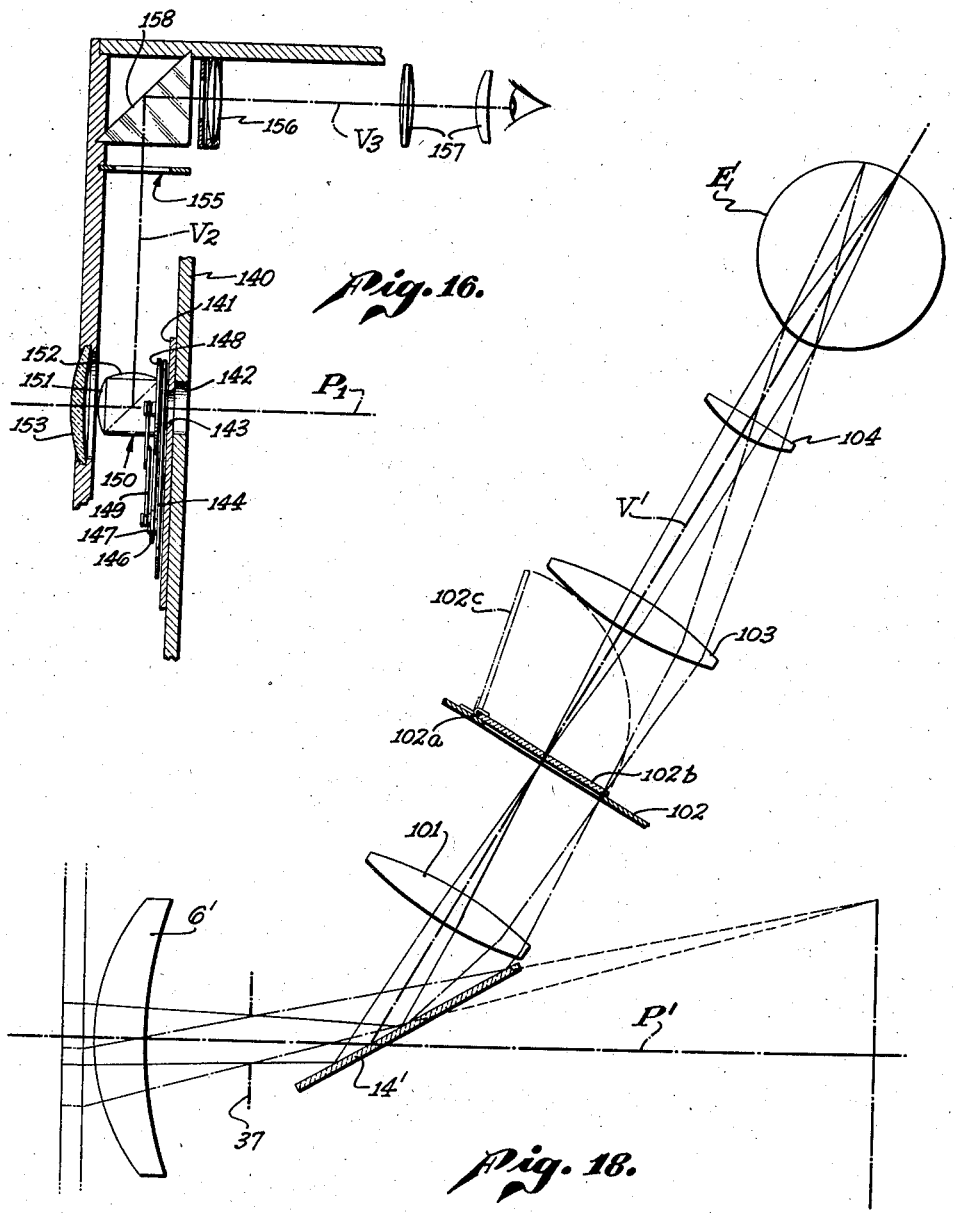

GORDON B. POLLOCK,
INVENTOR

BY
ATTORNEY.

Patented Dec. 12, 1944

2,364,652

UNITED STATES PATENT OFFICE 2,364,652

CAMERA CONSTRUCTION

Gordon B. Pollock, South Laguna, Calif.

Application June 16, 1941, Serial No. 398,186

34 Claims. (Cl. 95—42)

This application relates to photographic apparatus, and pertains particularly to a photographic camera of the type provided with a "reflex" viewing apparatus whereby the field of the photographic register and the field of the viewing device are established in the absence of a parallax error.

One of the principal objects of the invention is to provide a photographic camera provided with a "reflex" viewing mechanism arranged for projection of the viewing image along an inclined axis which may extend at an angle less than that of the conventional reflex camera, whereby greater compactness in the camera is obtained, together with a more comfortable viewing position on the part of the user.

A further object of the invention is to provide a "reflex" viewing apparatus for a photographic camera, which embodies an additional lens system cooperating with the camera objective to form a viewing lens system of different and preferably shorter focal length than that of the camera objective, whereby marked reductions in the over-all dimensions of the apparatus are effected, without loss of optical quality in the viewed image.

A further object of the invention is to provide a camera construction of the "reflex" type, which utilizes an auxiliary lens system cooperating with the camera objective for establishing the image to be viewed, whereby the effective "f" value of the camera lens system may be established at a greater value for the viewing operation.

A further object of the invention is to provide a camera construction of the "reflex" type, in which a brilliant aerial image may be examined in the viewing operation.

A further object of the invention is to provide a camera construction of the "reflex" type, provided with a film transport mechanism of an improved nature, in cooperative mechanical association with the reflex viewing mechanism.

Numerous forms of "reflex" cameras have heretofore been proposed, and for the most part these structures have been subject to certain inherent limitations, among which may be listed:

(a) *Bulkiness.*—This limitation has heretofore been imposed as the result of the necessity of using a rather large movable mirror reflector to reflect the whole cone of light from the objective, so that a full field and maximum brilliance of the ground glass image is obtained. In order to keep the mirror size down to a minimum, and to best utilize the space available within the camera, the mirror has conventionally been placed at an angle of about 45° to the photographic axis of the camera objective, producing a viewing axis extending at right angles to the photographic axis. The use of relatively short focal length camera objectives were substantially precluded.

(b) *Inadequate brilliancy of the viewing image.*—This limitation has heretofore imposed certain expedients which for the most part result in added bulkiness. The advent of the fast photographic emulsions has made it necessary to employ rather small photographic "apertures" during the actual picture taking, and when the viewing image is observed at this same aperture, it is frequently so dim as to be virtually useless. For this reason, large collapsible hoods have been provided about the ground glass image zone to exclude extraneous light, and these hoods were required to closely conform to the shape of the user's face to exclude troublesome reflections of bright objects or of the user's face, which extraneous light and reflections served to confuse the relatively weak ground glass image. Manufacturers have resorted to the use of mechanical means to open the aperture of the camera objective widely when the viewing image was being observed, and then reduce the aperture to a photographically useful value when a picture was taken, or have resorted to the so-called "twin lens" reflex system embodying a viewing objective of greater aperture than the camera objective, synchronized with the latter for focusing. This "twin lens" system is subject to parallax error which at best may be corrected at but one subject-camera distance.

(c) *A left-to-right reversal of the viewed image.*—This limitation results from the impracticability of utilizing well-known optical reversing means in order to correct the reversal caused by the camera objective, without unduly increasing the camera bulk. The "reflex" camera does produce an erect image, but the inherent right-to-left reversal still remaining from the inversion and reversal caused by the camera objective results in considerable confusion to the observer in photographing moving objects.

According to the present invention I am able to produce a camera construction in which all of the above limitations may be overcome in a construction of very compact form. It is therefore a particular object of this invention to provide a camera construction and a method of practicing photography which are substantially free of the above-enumerated limitations.

A further object is to provide a camera construction of the "reflex" type of markedly simplified mechanical construction, which may be manufactured at a very low cost compared with camera constructions of equivalent utility which have heretofore been available to the public.

The camera construction of the present invention may comprise, essentially, a camera housing provided with a camera objective lens and a film-placement structure, together with a viewing mechanism including a reflecting member such as a mirror or prism and a cooperating auxiliary lens or lens system arranged to cooperate with the camera objective, when the reflecting member is positioned for visual observation of the camera field, to provide a viewing objective system including said camera objective but preferably of shorter focal length than said objective. In its more preferred embodiments, the device comprises a viewing lens system integrally associated with the reflecting member for movement therewith, whereby when the reflecting member is positioned to direct the optical axis along the viewing axis, the auxiliary lens system is placed in position to cooperate with the camera objective in the formation of the viewing image, and when the reflecting member is moved out of the photographic axis to permit the desired photographic exposure, the auxiliary lens system moves therewith.

In its more preferred embodiment, the camera construction also embodies an improved form of film transport mechanism, comprising a transport reel or spool structure mechanically associated with the operating means which causes movement of the aforesaid reflecting member back into viewing position following a given photographic exposure, whereby the phenomenon commonly referred to as "double-exposure" is eliminated.

The invention also relates to an improved method of focusing and determining the field of view of a photographic camera, involving the use of an auxiliary objective lens in cooperation with the photographic objective in the formation of the viewing image.

Other features and objects of the invention will be brought out in the ensuing specific description, or will be apparent therefrom. Certain illustrative examples and preferred embodiments of the invention are shown in the accompanying drawings, in which:

Fig. 1 is a longitudinal section of a photographic camera embodying my invention;

Fig. 2 is a sectional detail thereof, taken on line 2—2 in Fig. 1;

Fig. 3 is a partly broken-away view corresponding to Fig. 1, showing the reflecting member and the associated lens system in the position which it adopts when an exposure has been made;

Fig. 4 is a detail in front elevation of the reflecting member and the associated lens system, as taken generally along line 4—4 in Fig. 1;

Fig. 9 is a transverse section thereof as taken on line 9—9 in Fig. 8;

Fig. 10 is a sectional detail of the construction of the combined reflecting member and auxiliary lens system, as taken on line 10—10 in Fig. 5;

Fig. 11 is a partly broken-away perspective view of the combined reflecting member and auxiliary lens system, showing the operating relation thereof to the shutter mechanism;

Fig. 15 is a partly broken-away front view of a modified form of camera construction in which a viewing device of the present invention is employed between the photographic lens and the shutter mechanism;

Fig. 16 is a partly broken-away view corresponding to sectional view as taken on line 16—16 in Fig. 15, and illustrating a modified form of camera construction employing the reflector and shutter mechanism of the form shown in Fig. 15, and provided with a modified type of viewing means adapted to establish an erect and left-to-right correct viewing image;

Fig. 17 is a ray tracing of the optical system embodied in the form of invention illustrated in Figs. 1 through 11;

Fig. 18 is a ray tracing of an optical system such as may be employed in the form of invention shown in Figs. 12 and 13, with the addition of a magnifying ocular system incorporating the principal advantages of the optical system shown in Fig. 17;

Figure 5:
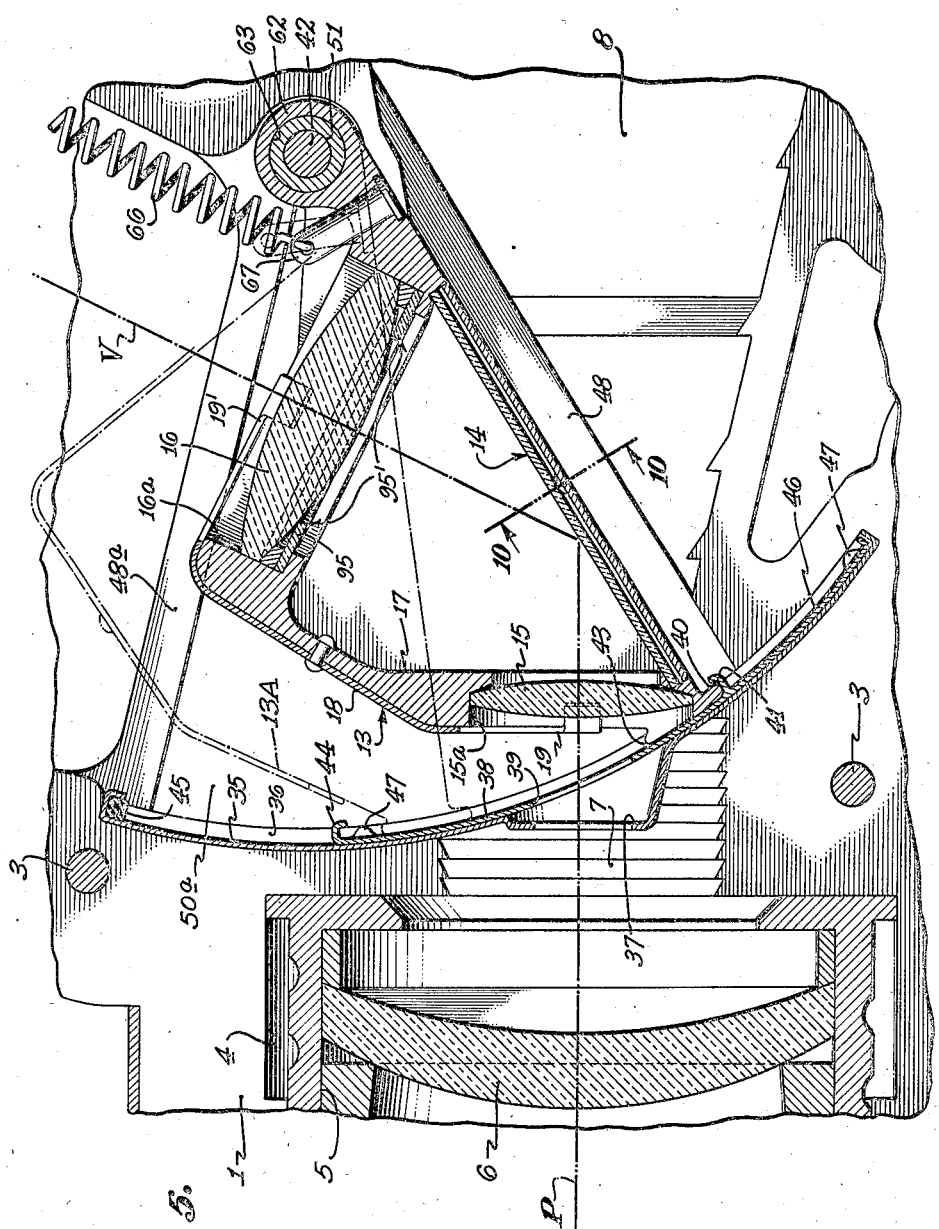
Fig. 5 is an enlarged, partly broken-away view corresponding to the central section of Fig. 1, with the reflecting member and its associated lens system positioned for establishing a viewing image, in full lines, and shown in dot-dash lines in an intermediate position corresponding to that in which a "time" exposure is made.

Referring to the drawings, Figs. 1 through 11 illustrate a preferred embodiment of my invention, incorporating the several features which cooperate to improve the camera function in an inexpensive construction. The device may comprise a housing portion defined by two substantially similar but oppositely shaped body portions 1 and 2 intersecured through the agency of holding screws 3 extending transversely through the body. The housing body portions are coactingly shaped to provide a lens-receiving recess 4 within which a lens barrel 5 carrying lens 6 may be disposed. The lens barrel 5 may be threadedly mounted within the recess 4, if desired, to provide a focusing mount. In axial alinement with the lens 6 is an opening 7 and an elongated passage 8 which terminates at the position occupied by the photographic register, such as a strip of film 9 which is carried by spools 10 and 11 in the customary manner. The lens 6 is adapted normally to produce a photographically useful image at the position of the photographic register. The body portions 1 and 2 are further shaped to define a recess 12 within which the reflex viewing mechanism may be disposed.

This reflex viewing mechanism may comprise a pivotally mounted lens support member or reflector assembly 13 provided with a reflector member 14 extending angularly across the rearward projection of the optical axis of the lens 6 in position to reflect light from the objective 6 along an inclined axis indicated by the dot-dash line V; the reflector 14 thus serves to define a viewing axis which includes the inclined axis V and coincides with the photographic axis P forwardly of the position of the member 14. In this form of the invention the assembly 13 is provided with two lenses 15 and 16, the lens 15 being disposed on the axis P forwardly of the reflector 14 and the lens 16 being disposed on the viewing axis V rearwardly of the reflector 14. In the position shown in Fig. 1 the lens and reflector assembly 13 is in the position which establishes the desired image to be viewed by the user, and in the position shown in Fig. 3 the lens and reflector assembly has been moved upwardly to the position adopted following an exposure of the film 9 as will be subsequently described.

Cooperating with the body portions 1 and 2 I provide a hinged back 21 for the structure, which may comprise a single piece casting or molding pivotally secured to the body portions 1 and 2 as at 22 and extending rearwardly past the position of the spool 11, thence upwardly across the back of the space 8, thence over the space occupied by the spool 10, into engagement with the body portions 1 and 2 at its upper end. At this upper end position I may provide a locking assembly, indicated generally at 23, comprising a catch 24 rigidly mounted in the member 21 as through the agency of a rivet or the like 25, adapted to engage a spring bolt 26 slidably mounted within two coactingly arranged bores 27 and 28 in the respective body portions 1 and 2. The bolt 26 is provided with a milled-out central section 29 and a contiguous slot 30 adapted to receive the head of the catch 24, as is shown more particularly in Fig. 2. When the back member 21 is pushed into position to lock the same and close the camera against outside light, the catch 24 presses against the edge of the slot 30, forcing the bolt 26 inwardly against the spring 31 and allowing the catch to pass through the slot 30, upon which the spring 31 will press the bolt 26 back under the catch 24 and lock the backs into position. When it is desired to open the back, a projecting knob 32 on the bolt 26 may be pressed in, and the operation reversed.

The lens and reflector assembly 13 in this embodiment forms a part of the shutter system for the camera, and this shutter system may comprise a fixed plate 35 of arcuate shape carried in a coactingly shaped pair of laterally spaced slots 36 formed in the respective body portions 1 and 2, the plate 35 being provided with an aperture 37 extending forwardly into the recess 7. Cooperating with the fixed shutter plate 35 is a movable shutter plate 38 formed of thin metal or the like and provided with an opening 39 in axial alinement with the aperture 37 along the photographic axis P. When the lens and reflector assembly 13 is in the position indicated in Fig. 5, in which the reflector 14 is positioned to establish the viewing axis along the inclined axis V, the movable shutter plate 38 is in its lowermost position and is forced into such position through the agency of a shoulder 40 extending along the lower forward edge of the lens and reflector assembly 13 and engaging a shoulder member 41 provided on the plate 38. The function of the shutter is substantially as follows: when the lens and reflector assembly 13 is released through the agency of the structure hereinafter described, and is pulled upwardly about its pivot axis 42, the shoulder 40 moves upwardly away from the shoulder 41. As the lower edge of the member 13 uncovers the opening 39, as in moving towards the dot-dash position indicated at 13A in Fig. 5, the exposure of the photosensitive surface at the rearward end of the space 8 takes place. The full exposure of the photosensitive surface continues from the time that the lower edge of the shoulder 40 passes the upper edge of the opening 39 and until the upper edge of a second shoulder 43 at the forward portion of the assembly 13 engages the upper end of the movable shutter member 38. The upper end of the shutter plate 38 is preferably hooked over as indicated at 44 to facilitate engagement thereof by the shoulder 43. When the shoulder 43 engages the hooked-over portion 44 the assembly 13 continues its upward movement and carries with it the movable plate 38, which plate is carried upwardly until the upper ends of the slots 36 are reached, and a suitable rubber bumper or the like 45 is provided to absorb the shock of stopping the lens and reflector assembly 13 in this uppermost position, which is indicated in dot-dash lines in Fig. 1 and in full lines in Fig. 3 by the reference character 13B. When the movable shutter plate 38 is carried up after engagement of the upper end 44 thereof by the shoulder 43, the opening 39 is moved away from the photographic axis P and the opening 37 is covered by the lower end 46 of the shutter plate 38.

Upon the return movement of the lens and reflector assembly 13 to the position shown in full lines in Fig. 5 for the resumption of a new photographic operation, the shoulder 41 will be engaged by the shoulder 40 when the shoulder 40 reaches the approximate level of the photographic axis P, and the movable shutter plate 38 is then carried downwardly into the position shown in full lines in Fig. 5. The shutter plate 38 is, as above described, preferably formed of a light-weight spring metal, and is preformed to a radius less than that of the slots 36. The plate is preferably provided with bent-up tabs or ears 47 at each end and at each lateral side, which are of sufficient height to correctly position the plate against the forward walls of the slots 36, and the preformed smaller radius of curvature of the plate will cause the plate to bear against the rearward edges of the slot 36 at the position of the projections 47, thus forcing the central portion of the plate 38 toward the fixed plate 35.

In order to prevent passage of light past the lens and reflector assembly 13 when the assembly is in the viewing position, I provide an inwardly extending ledge 48 at each side of the space 8, in position to engage the lower edges 49 of the bottom wall 50 of the assembly 13, as shown more particularly in Fig. 10. The ledges 48 may also be employed to limit the downward rotational movement of the assembly 13 about the pivot point 42. Similarly, inwardly extending ledges 48a may be provided at a position such as to be engaged by the upper edges 49a of the bottom wall 50 of the assembly 13 when such assembly is in the position 13B, to prevent light infiltration from the viewing ocular through the recess 12 to the photosensitive surface at 9 after an exposure is made. It will be appreciated that a rather close clearance may be established between the lateral edges of the bottom wall 50 of the assembly 13 and the side walls 50a of the body portions 1 and 2 which define the recess within which the assembly 13 is moved, and any sharp shoulder will prevent direct passage of light through the narrow slit formed by this close clearance.

Referring more specifically to the construction of the lens and reflector assembly 13, this assembly may comprise a shell or housing 17 provided with recesses 15a and 16a within which the respective lenses 15 and 16 are mounted. The lenses 15 and 16 are maintained in place within the corresponding recesses 15a and 16a through the agency of a spring clip member 18 which may be riveted or otherwise secured to the shell 17 and carrying bifurcated end portions 19 and 19' which are brought about over the lateral edges of the lenses 15 and 16 to resiliently engage the same and crowd them rearwardly into their respective recesses. A suitable recess 20 is provided within the lower end of the housing 17, within which the reflector 14 is mounted. The reflector 14 is of the "front-surfaced" type. The reflector 14 is secured within the recess 20 in any suitable manner, although I prefer to provide a backing member 20' of light-weight sheet spring material which is extended over the lower surface of the reflector member and is secured to the edge of the bottom wall 50 of the housing 17 through the agency of tabs or ears 20a which are disposed in coactingly shaped grooves or recesses indicated at 20b so as to obtain a flush mounted effect. A small projection 20c is provided at the center of the reflecting element 14, which may be formed as a part of or attached to the attaching member 20', and which will bear upwardly against the rearward side of the reflector 14 to accurately position the same against the recess 20.

The lens and reflector assembly 13 is pivotally mounted for movement on the axis 42 (Figs. 1 and 5), preferably through a structure which also serves as a release and re-set mechanism. Such structure may comprise a shaft 51 provided at one end with a pulley 52, the hub portion 53 of which is journaled in a suitable opening 54 in the body portion 1. The end of the shaft 51 beyond the pulley 52 projects laterally as at 51' into a fixed ratchet member 55 which is fixed in a cover plate portion 56. The other end of the shaft 51 is indirectly journaled into the body portion 2 through the agency of a cylindrical slide member 58 carrying a threadedly mounted push button 59, the inner end 61 of which bears directly against the adjacent end of the shaft 51. The lens and reflector assembly 13 is pivotally mounted on the shaft 51, and is freely rotatable with respect thereto. The mounting of this assembly on the shaft may be provided through the agency of a bushing or the like 62 which is press-fitted in a corresponding bore 63 in the housing 17. The shaft 51 and its associated pulley 52 are mounted for sliding movement within the corresponding bores in the body portions 1 and 2, and these parts are biased in a right-hand direction in Figs. 6 and 9 through the agency of spring pawl members 64 secured to the outer face of the pulley 52 and adapted to engage the fixed ratchet 55 above mentioned. The hub 53 of the pulley 52 and the adjacent end portion of the bushing 62 are provided with coacting ratchet means 65—65' and such ratchet means are so oriented with respect to the ratchet pawls 64 and the ratchet teeth 55a of the fixed ratchet 55 as to cause the lens and reflector assembly 13 to rest in the full line position shown in Figs. 1 and 5 when the ratchet pawls 64 are shown in engagement with the aforesaid ratchet teeth 55a.

Figure 6:
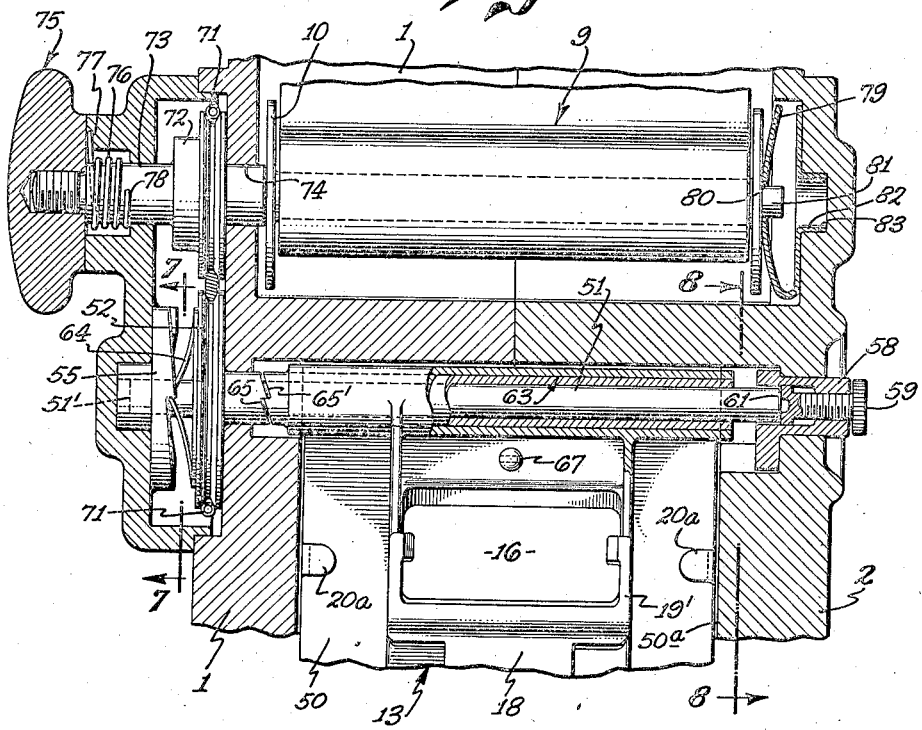
Fig. 6 is a partly broken-away transverse section, taken on line 6—6 in Fig. 1.
Figure 8:
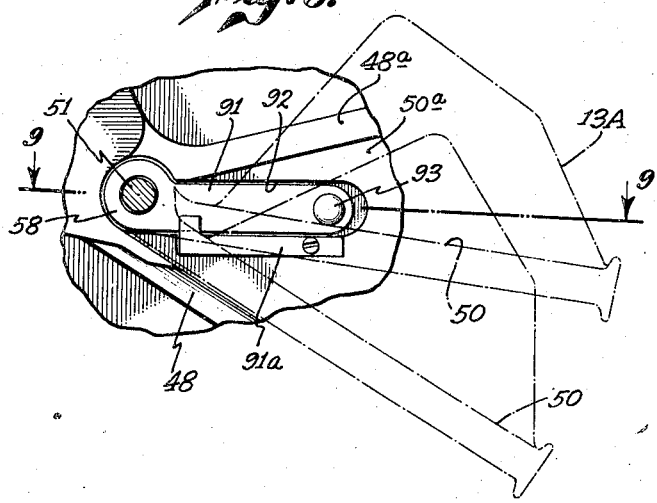
Fig. 8 is a partly broken-away sectional detail as taken on line 8—8 in Fig. 6, illustrating the construction and operation of the "time" exposure mechanism.
Figure 7:
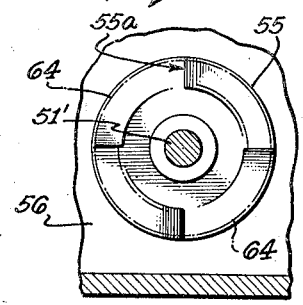
Fig. 7 is a sectional detail taken on line 7—7 in Fig. 6.

Assuming the lens and reflector assembly 13 to be in the position shown in full lines in Figs. 1 and 5, in which position the shaft 51, pulley 52, and the associated ratchet assemblies will be in the positions illustrated in Fig. 6, the release of the assembly 13 into the position 13B shown in dot-dash lines in Fig. 1 and in full lines in Fig. 3 is accomplished in the following manner: the finger is pressed against the push button 59, the inner end 61 of which in turn bears against the end of the shaft 51, causing said shaft to be pushed inwardly, which disengages the ratchet portion 65 on the pulley 52 from the ratchet portion 65' which is on the sleeve 62, and the assembly 13 is then pulled toward the position 13B through the agency of a tension spring 66 which is secured at one end to the housing and at the other end to a suitable pin or the like 67 formed integrally with the housing 17 of the assembly 13. The finger pressure on the push button 59 may then be released, causing a re-engagement of the ratchet 65—65'.

In order to "cock" the lens and reflector assembly 13 in the position shown in full lines in Fig. 1, it is merely necessary to rotate the pulley 52 until the assembly 13 is brought into its desired lowered position, during which rotation the ratchet pawls 64 will be rotated and will engage with the next set of ratchet teeth 55a on the fixed ratchet 55. The rotation of the pulley 52 is conveniently secured through the agency of a spring belt 71 looped over and in engagement with a pulley 72 carried on a stub shaft 73 journaled in the housing as at 74 and terminating exteriorly in a thumb knob 75. The spring belt constitutes an "over-riding" clutch member in that continued rotation of the knob 75 is possible after the full movement of the assembly 13 is effected. The thumb knob 75 is conveniently secured to the stub shaft 73 by threaded engagement, and in order to prevent the pulley 72 from being rotated in the wrong direction, I may provide a spring clutch 76 comprising a spring member secured at one end to the housing as at 77 and wrapped about the stub shaft 73 a plurality of turns, with the free end 78 thereof in frictional engagement with the stub shaft. The film transport mechanism is conveniently connected to the stub shaft 73 at the inner end thereof. For this purpose the inner end of the stub shaft 73 may be provided with a suitable dog or key 70 (see Fig. 11) adapted to engage the slotted end of the conventional film spool 10, and the opposite end of this spool may be supported through the agency of spring member 79 (see Fig. 6) provided with an opening 80 adapted to receive the projecting stub 81 of the spool 10. The spring member 79 may be formed as a simple leaf spring having an outwardly deformed cylindrical positioning portion 82 adapted to engage in a suitable bore 83 in the side wall of the body portion 2.

It will be appreciated that after a given area of the film 9 is exposed and the lens and reflector assembly 13 has moved to the position 13B, the rotation of the thumb knob 75 will cause a positive rotation of the spool 10 to roll the film 9 onto the spool, and through the spring belt 71, the pulley 52 will also be rotated, which will carry the lens and reflector assembly 13 to the "cocked" position of Figs. 1 and 5. Further rotation of the knob 75 will continue to roll the film on the spool 10 without further change in the position of the lens and the reflector assembly 13.

In order to provide for proper advancement of the film after a given exposure is made, I may provide an opening 84 in the pressure plate 85 which serves to hold the film 9 in the correct photographic plane. This opening 84 will be positioned to uncover the conventional markings on the back of the roll of film, which is shown in Fig. 1 as comprising a single layer of material but will be understood to include an inner layer of photosensitive material and an outer layer of opaque paper or like material according to common practice. These numerals may be viewed from the back of the camera in the conventional manner through a conveniently arranged ruby glass or Celluloid layer 86. The pressure plate 85 is preferably spring biased as through the agency of the spring 87 forwardly against the position of the film 9, and may be slidably carried on a suitable support member 88 which is secured to or forms a part of the back cylinder 21.

In order to provide for taking "time" exposures, or, more properly, "bulb" exposures, I may provide means for interrupting the upward travel of the assembly 13 prior to the moment that the upper shoulder 43 at the forward end thereof engages the bent-over portion 44 at the upper edge of the movable shutter plate 38, and thus fix and hold the assembly 13 in a position which fully uncovers the opening 39 in the shutter member 38 but before the shutter member 38 is caused to move upwardly to again cover the aperture provided by the opening 37. Such means are conveniently associated with the push button 59 and in the simple construction which I have illustrated I employ the cylindrical member 58 for this purpose. This member 58 is provided, as is shown more particularly in Fig. 8, with a forwardly projecting arm 91 disposed in a suitable slot 92 which may be formed in the inner side wall of the body member 2, which arm 91 is provided adjacent its forward end with a transversely projecting lug 93. The arm 91 is transversely slidable within the slot 92, being biased inwardly thereof by a spring 91a, for example, and if the push button 59 is unscrewed, the inner end 61 of the push button 59 will be carried away from the end of the shaft 51, and if it is screwed out to some such position as indicated in Fig. 9, the inward pressure on the button 59 with the finger will cause the cylindrical portion 58 to be moved inwardly before the inner end 61 of the push button 59 actually engages the opposing end of the shaft 51. This movement will cause the arm 91 and the lug 93 to be moved inwardly to a position such that the forward end 94 of lug 93 will be substantially in line with the edge of the housing 17 as defined by the wall 50, when the inner end 61 of the button 59 is just in contact with the shaft 51. Further inward movement of the push button 59 will then cause the inner end 61 to bear forcibly against the shaft 51, forcing the ratchet portion 65 out of engagement with the ratchet portion 65' formed on the bushing 62. When the inward movement has been sufficient to disengage the coacting ratchet means 65—65', the lug 93 will then be extended over the edge 50, as shown particularly in Fig. 9. Further inward movement of the push button 59 will fully disengage the ratchet means 65 and the assembly 13 will be released for its upward movement, which movement will be stopped when the edge 50 comes into actual engagement with the lug 93, as shown more particularly in Fig. 8.

Referring to Fig. 5, this will place the assembly 13 in the position indicated at 13A, and the exposure of the photo-sensitive surface will be under way. When the desired length of exposure has been obtained, the pressure may be released on the push button 59, and the spring effect of the spring pawls 64 will then push the shaft 51 outwardly, carrying with it the arm 91 under the biasing action of the spring 91a and withdrawing the lug 93 from engagement with the edge 50; the assembly 13 will then move to the position 13B shown in full lines in Fig. 3.

In this particular form of the invention, the lens 15 is designed so as to cooperate with the lens 6 and throw an image corresponding to that which would be produced at the position of the photographic film 9 with the lens and reflector assembly not in the position shown in Figs. 1 and 5, and such image may be produced, for example, in or adjacent the plane of the lens 16. In order to properly demark the area of the image so as to conform strictly to the area which would be covered on the film 9 during an exposure, I may use an aperture member 95 adjacent the lens 16. This aperture may comprise a rectangular piece of metal or other opaque material, but I prefer to form it of ground glass or a ground Celluloid so that two advantageous results are obtained. These results are more properly described in connection with the actual viewing of the camera image formed by the combined objective lenses 6 and 15, which is accomplished through the use of a low power ocular formed of the lens 16 and an eye lens 96 positioned along the axis V at a prescribed distance with respect to its focal length.

The eye lens 96 may be mounted in a suitable bore 105 provided by a tubular portion 106 formed by the respective body portions 1 and 2, said lens 96 being held in place against a shoulder 107 through the agency of a tubular member 108 provided with inwardly directed rim portion 109 adapted to engage the outer surface of the lens 96 adjacent the periphery thereof.

When the user's eye is placed as at E along the viewing axis V, as in Fig. 1, the user will see an erect but right-and-left reversed image of the photographic subject. This image will be magnified or diminished depending upon the focal length of the eye piece (the magnifying power of the ocular), and in Fig. 17 I have illustrated the optics of the construction shown in Figs. 1—11. From this figure it will be apparent that the lens 15 when placed along the photographic axis P will cooperate with the objective or camera lens 6, serving as an auxiliary objective lens to produce a combined lens of shorter focal length than the objective 6. This places, in the frame of the lens 16, the image which would ordinarily be focused at the picture or film plane F, as indicated by the dotted line 97. The eye lens 96 of the ocular system projects the image from the plane 97 onto the retina of the eye E, and with the lens values indicated by the delineated curvatures the observed image will be approximately 0.7 times the image which would be produced at the plane F by the lens 6 alone. When the aperture 95 is interposed as in Figs. 1 and 5, the portion of the image which is within the clear opening 95' of the aperture would be viewed as an aerial image, with all structure of the image plane being discernible. In the translucent or ground glass areas located outwardly of the window 95' provided by the aperture 95, the image will be also discernible, but as a ground glass image, upon which actual focusing may be had by rotation of the focusing mount 5 for the lens 6. The portion of the image lying on the ground glass area of the aperture 95 will also serve to apprise the user of the adjacent portions of the photographic subject which are outside the field of view of the camera, which will assist both in composition and in properly timing the release of the shutter mechanism in relation to objects moving into the field of view.

In the lens assembly illustrated in Fig. 17, it will be appreciated that a brilliant image is secured from the eye lens 96. This brilliant image is subject to much greater magnification than that shown without loss of brilliancy, inasmuch as with these particularly selected optics there is no brilliancy limitation by the diaphragm formed by the opening 37, which is the effective diaphragm for the photographic system when the picture is being taken. Rather, the limitation of light to the eye through the viewing lens system is that obtained by the pupil to the eye itself, as indicated by the ray pencil shown in light dot-dash lines at 98. It will be appreciated that the magnifying power of the viewing eye piece may be increased until the entrance pupil of the system (indicated at 99) is as large as the aperture 37, without loss of brilliancy in the image as far as the eye is concerned. It will further be appreciated that the value of the auxiliary objective lens 15 may be made such as to place the image from the combined lenses 6 and 15 at any desired position along the axis V, without departing from the spirit and scope of this invention, so that a resultant focal length of the two lenses may be shorter or longer than the focal length of the objective lens 6, depending upon whether a positive or negative auxiliary lens is used to meet the requirements desired in a particular construction.

With the particular lens system shown in Fig. 17, employing a positive lens 15 to supplement the objective lens 6, the effective "f" value of the objective system is greater when the viewing image is being established than when the objective lens 6 is used alone to form a desired image at the position of the photographic register. The advantages of this construction are readily apparent in that present-day photographic emulsions make it possible to take exposures at quite small "f" values, the ordinary reflex type of camera showing such a dim image on the ground glass that it is usually necessary to open the shutter iris to a much larger value when the image is being examined than is desired for the actual exposure of the photographic surface. In order to avoid this difficulty it has heretofore been suggested that two separate systems be established, one used solely for producing the photographic image and the other used solely for viewing purposes. This results in the so-called "twin lens" type of camera structure, with the consequent increase in bulk and the inevitable parallax error.

It will further be appreciated that the auxiliary objective lens shown at 15 in the above described form of the invention need not be placed directly on the photographic axis P. For example, the lens comparable to the lens 15 may be disposed as is shown at 101 in Fig. 18, along the inclined portion of the viewing axis V', in such position as to establish an image at the position of an aperture or window indicated in section at 102. It will further be appreciated that the auxiliary lens system does not need to be made movable, inasmuch as in the case illustrated in Fig. 18, the cooperating reflecting member 14' may be moved out of the photographic axis P' into a position outside the field of view of the lens 6', without requiring movement of the lens 101. An ocular lens system may be employed as indicated at 103 and 104, this particular ocular system being shown as providing a somewhat higher magnification than that obtained with the optics shown in Fig. 17. The ocular arrangement may be dispensed with, if desired, and a ground glass substituted at the position of the aperture 102, if desired, and in this case the image established by the lenses 65 and 101 will be viewed directly.

The above-mentioned ground glass, when used with an ocular system, may be pivotally mounted as at 102a at the position of the aperture 102 so as to lie across such aperture as indicated at 102b or to be moved away from such aperture to some such position as indicated at 102c. With this construction, the optics will provide a "brilliant image" as long as the ground glass member 102b is swung aside, giving all the advantages of the above-described constructions as to observation of the photographic subject, and if the camera is provided with a focusing mount objective, the ground glass 102b may be used directly for precise focusing when it is swung into position across the aperture 102.

Figure 12:
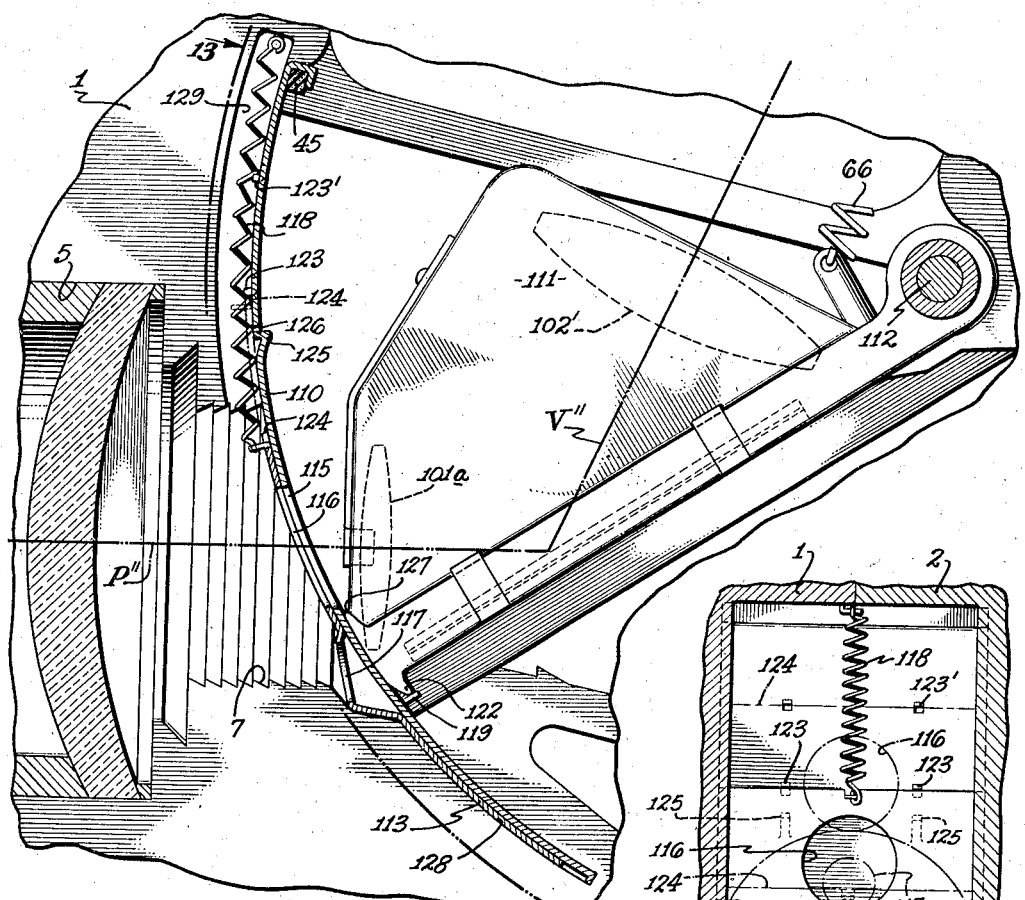
Fig. 12 is a view corresponding generally to Fig. 5, showing the structure of a modified form of the invention, which provides for the establishment of a materially higher "$f$" value for the optical system when it is used to view the image of the photographic subject along the viewing axis than is employed when the photographic objective is used to produce the desired photographic register.
Figure 13:
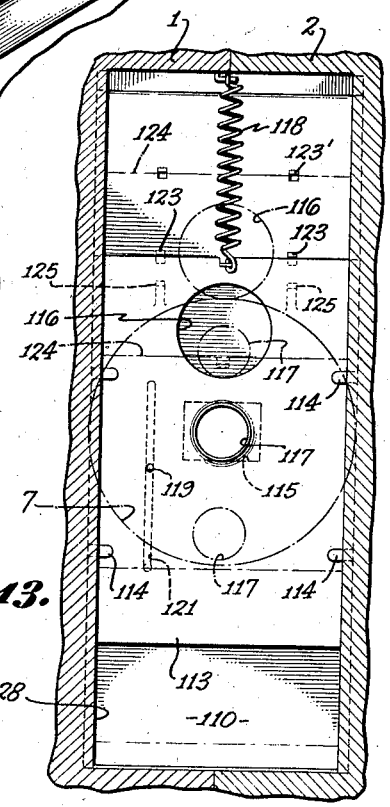
Fig. 13 is a reduced scale partly broken-away view thereof, as taken on line 13—13 in Fig. 12.

If the ocular system 103—104 is omitted, and a field lens 102' substituted for the ground glass at 102, for binocular observation of a "brilliant" image, it is highly advantageous to employ a larger "stop" at the position corresponding to the opening 37, when the viewing mechanism is being employed, than is employed when the exposure of the photographic film is being made. For such an expedient I may provide a construction such as is illustrated in Figs. 12 and 13 in which a modified shutter arrangement is employed. In this construction, which corresponds quite generally to the construction illustrated in Fig. 1, the fixed portion of the shutter or shutter plate 110 may be disposed in suitable slots in the respective body portions 1 and 2, in fixed relation to a movable lens and reflector assembly 111, which is pivotally mounted for movement about an axis 112 corresponding to the axis 42 above, and is provided with a lens 101a corresponding to the lens 101 of Fig. 18, and a field lens 102'. The movable portion of the shutter may be slidably mounted upon the forward face of the fixed shutter plate 110, as at 113, such movable portion 113 comprising a rectangular plate secured in position upon the shutter portion 110 through the agency of a plurality of ears 114, cut from and bent away from the plane of the member 110 over the face of the member 113 at the edges thereof. The member 110 is provided with an opening 115 corresponding in size to the maximum size of opening that is desired in the construction, this opening being laterally widened to provide the desired large angular field of view necessary to binocular observation of the image at 102'. The movable plate 113 is provided with an opening 116 large enough to uncover the opening 115. These two openings are alined when the shutter is in position such as to provide for establishment of the viewing image along the inclined axis V" and an auxiliary opening indicated at 117 is provided which will define the "stop" through which the desired exposure of the photographic surface is effected. This opening 117 is provided in the movable shutter portion 113, and is adapted to be moved up to the photographic axis P" when the lens and reflector assembly 111 is released for an exposure. It will be appreciated that the enlarged aperture 116 may be shaped in conformity with the opening 115, if desired, and either the opening 115 or the opening 116 may serve to define the laterally enlarged field.

The desired movements of the shutter may readily be obtained by providing a spring bias, as by a spring 118, tending to move the shutter portion 113 upwardly at all times. A suitable projection 119 may be provided on the member 113, extending through a slot 121 in the fixed plate 110. This projection 119 is positioned to be engaged by the forward lower edge 122 of the assembly 111, corresponding to the shoulder 40 in the first described form of the invention, and when the assembly 111 is released the shutter member 113 will follow upwardly therewith under the bias of the spring 118. In order to stop the shutter portion 113 at its desired position along the photographic axis P", I may provide one or more projections 123 extending upwardly from the fixed shutter portion 110 and adapted to engage the upper edge 124 of the portion 113 when the opening 117 is in correctly alined position. When the upper edge 124 of the shutter portion 113 engages the projections 123, the assembly 111 will continue to move upwardly and as the opening 117 is uncovered by the lower edge 122 of the assembly 111 the photographic exposure will take place. At a suitable distance above the position at which the opening 117 is exposed for photography, I provide a member which will be engaged by the assembly 111 and disengage the shutter member 113 from the projections 123. Such a disengaging member is indicated at 125, which may be punched out from the member 110 as at 126 and may comprise a spring lever which is normally disposed in the full line position illustrated in Fig. 12 and which may be deformed forwardly. When the upper edge 127 of the forward portion of the assembly 111, corresponding to the shoulder 43 in Fig. 5, reaches the disengaging means 125, this member 125 will be forced outwardly against the shutter portion 113, deforming the latter outwardly and forwardly until the upper edge 124 thereof clears the forward edges of members 123, whereupon the spring 118 will quickly draw the shutter member 113 upwardly into engagement with a pair of pins 123' by the upper edge 124, so that the lower opaque end thereof indicated at 128 covers the opening 115. A suitable slot may be provided as at 129, extending forwardly from the shutter portion 110, in position to engage the upper edge 124 of the shutter member 13 when it is in its uppermost position. When the assembly 111 is moved downwardly to "cock" it in position for a new exposure, the rounded lower shoulder 122 will pass over the rearward projection of the member 125, forcing it inwardly without damage to the shutter portion 113, and when the shoulder 122 engages the projection 19, the shutter portion 113 will be brought toward and into the position shown in full lines in Fig. 12.

In Fig. 13 the movable shutter portion 113 is shown in full lines in the intermediate position adopted during exposure of the photographic negative surface through the opening 117. The positions of the shutter in its lowermost and uppermost positions are shown in dot-dash lines. It will be appreciated that a suitable slot or the like will be provided as at 129 in the body portion of the device, which may be along the medial line of the two housing body portions 1 and 2, if desired, within which the spring 118 may be disposed. Similarly, ample space will be provided forwardly of the shutter plate 110 for free movement of the movable shutter portion 113, and all openings caused by punching out portions of the plate 110 for projections or the like will be suitably filled so that a light-tight construction will be obtained.

Figure 14:
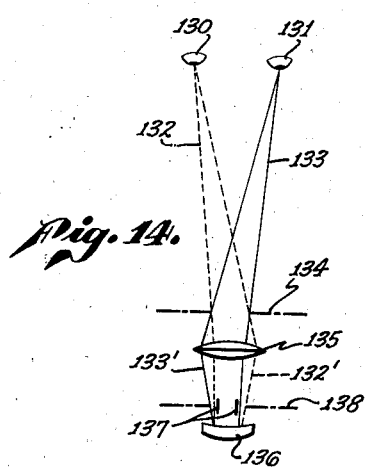
Fig. 14 is a diagrammatic view, illustrating the effect obtained in the use of a structure of the character set forth in Figs. 12 and 13, as compared to the effect resulting when the same "$f$" value is used both for viewing and for photography.

In Fig. 14 I have illustrated the effect of the provision of the enlarged stop 116 in connection with binocular observation of the field lens or image area. Referring to this figure, the user's two eyes are indicated at 130 and 131, with the field view thereof being indicated respectively by dashed lines at 132 and solid lines at 133. These two fields of view are directed toward the viewing image window indicated at 134 and the auxiliary viewing objective lens indicated at 135 and the main camera objective at 136. The reflector assembly is omitted in this view for simplification of the showing, inasmuch as the optics would be equivalent with or without this reflector element. The normal photographic stop such as would be employed in producing the desired photographic register is indicated at 137, and the enlarged stop such as would be provided by the opening 116 is indicated at 138. A study of this showing will make it apparent that if the smaller stop 137 were allowed to remain in place when the image at 134 was being viewed with both eyes, the lateral edges of the field of view of each eye would be obscured by the edges of the stop 137, a condition which would not exist if the area 134 were observed with a single eye along the viewing axis indicated at 139. The provision of the enlarged stop at 138 makes it possible for both eyes to secure a completely illuminated field view, which renders the observation of the image at 134 much more satisfactory.

In Fig. 15 I have illustrated a modified form of camera construction, as the invention may be applied to an inexpensive camera of the "box" type. Referring to this figure, the forward wall of the camera is indicated at 140, provided with a face plate 141, the forward wall 140 being provided with a suitable opening 142 and the face plate 141 being provided with a corresponding opening 143 which functions as the "stop" for the camera. Forwardly of the plate 141 I provide a rotating shutter member 144 provided with a slot 145 positioned to be passed over the position occupied by the opening 143 in the exposure of the photographic film with which the camera is provided, such film being located at a suitable position spaced from the objective lens 153 along the photographic axis $P_1$. A suitable operating lever 146 is provided to produce the desired movement of the disc shutter 144, the lever 146 being pivotally mounted as at 147 for movement between the solid line and dot-dash line positions as shown. The lever 146 carries a circular plate 148 which is adapted to be positioned over the opening 143 during the return movement of the circular shutter 144 as hereinafter described. The actual movement of the circular shutter 144 is obtained through the agency of a spring 149, one end of which is mounted on the circular shutter and the other end of which is mounted on projection of the operating lever 146. Upon movement of the lever 146 toward the dot-dash line position, the spring 149 will cause a clockwise rotation of the circular shutter 144 when the dot-dash line position of the lever 146 is reached, and as the push button 146' of the lever 146 is released and the lever 146 returned toward the full line position, a reverse movement of the shutter 144 will take place. At the time the clockwise movement of the shutter 144 is caused to take place, the circular disc 148 is removed from in front of the opening 143 and the exposure takes place when the slot 145 passes this opening 143. On the counter-clockwise return movement of the shutter 144, the circular disc 148 is superimposed over the opening 143 when the slot 145 returns to its original position shown in full lines. All of the above-described construction is conventional in cheap cameras of the box type and my invention is applied thereto as a simple expedient of securing a reflecting prism or mirror assembly 150 to the disc member 148 in optical alinement along the axis $P_1$. This prism structure may be provided with cooperating lens members 151 and 152 on the respective forward and upward faces thereof, which cooperate with the camera objective 153 in a manner comparable to that described in connection with Figs. 1 through 11 with reference to the objective lens 6 and the auxiliary lens 15. A field lens 154 is provided at a suitable position removed from the photographic axis $P_1$, and positioned to intercept the reflected light rays from the objective 153 which are directed upwardly along the viewing axis $V_1$ by the prism and lens assembly 150, 151 and 152. It will be appreciated that a ground glass may be substituted for the lens 154, if desired, although a more brilliant image is secured by the use of such a field lens. The curvatures of the lenses 151 and 152 will be so selected with reference to the objective 153 as to establish a real image at the position of the lens or ground glass employed at 154. The provision of separate lenses 151 and 152 on the reflector element 150 is not essential, as will be apparent to those skilled in the art, inasmuch as a single lens in either position may be employed to secure the substantially equivalent optical performance of the construction.

In Fig. 16 I have illustrated a shutter and lens assembly of the type shown at reference numerals 140 through 153 in Fig. 15, together with a modified viewing lens assembly which is adapted to function as a reversing magnifier to view the image established at an aperture 155 corresponding, in general, to the position of the field lens 154 shown in Fig. 15. The reversing magnifier viewing device may comprise an objective lens 156 and an ocular 157, together with a reflecting member such as a totally reflecting prism 158. It will be appreciated that the image produced by lens system 153 plus 151 and 152 at the position 155 will be erect but right-to-left reversed. The reversing viewing member and its reflector 158 will cause the image to be viewed in an erect and left-to-right correct fashion owing to the inversion caused by the reflector 158 and the subsequent complete reversal by the objective lens 156. It is appreciated that the optics indicated in Fig. 16 are rather simple, and compound lenses may be employed at any desired position so that the resultant image is of good optical quality. It will furthermore be appreciated that an auxiliary reflector and a full reversing optical system, for example, may be incorporated in any of the above described constructions, without departing from the spirit and scope of this invention. In this form of the invention, as in the form shown in Fig. 15, the "inclined axis" may extend substantially normal to the photographic axis, and in the form shown in Fig. 16, specifically, the viewing axis includes not only the portion of the photographic axis $P_2$, but the inclined axis portion $V_2$ as well as the magnifier axis $V_3$.

Figure 19:
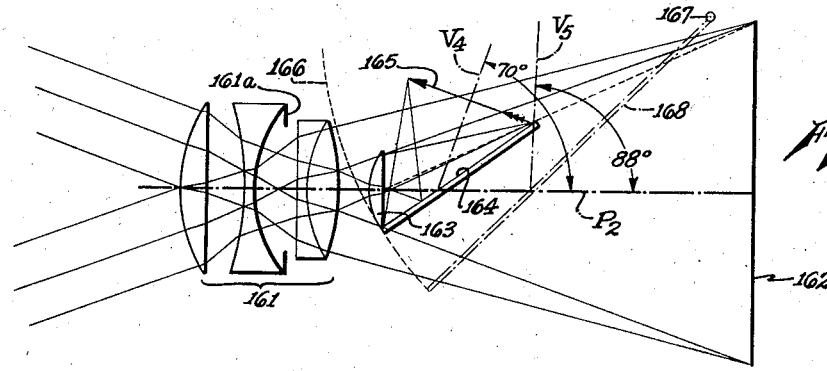
Figs. 19 and 20 are ray tracings illustrating the application of the invention to a "Tessar" type of photographic objective, showing the positions of the optical members when focused at infinity and at 6 feet, respectively.
Figure 20:
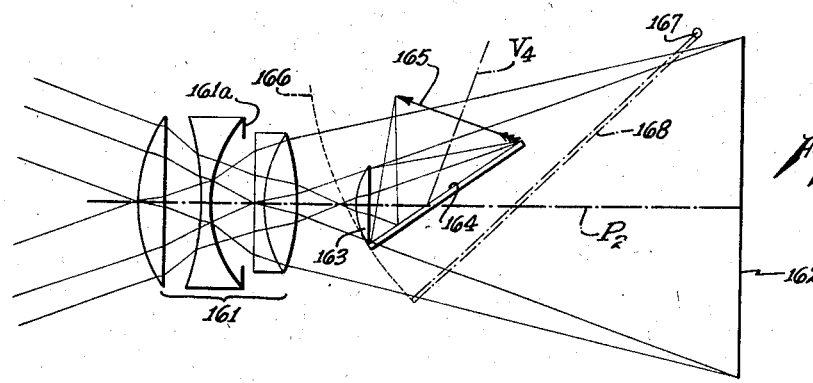

Figs. 19 and 20 show a "Tessar" type of photographic objective 161, mounted on a photographic axis $P_2$ and adapted to produce a photographically useful image at a register plane 162. The auxiliary objective lens 163 and the cooperating reflecting member 164 are placed rearwardly of the objective 161, on the axis $P_2$, and are adapted to establish an inclined viewing axis portion $V_4$. The lens 163 and reflector 164 may be established in a housing member such as shown at 17 in the first described form of the invention, and may cooperate with the objective 161 to form an image at 165. In order to clear the main objective mounting, the lens and reflector will have to be mounted so as to move past the rear element of the objective 161 at a position no closer than about that indicated by the dotted path 166, and such movement may be pivotal, as about the pivot shown at 167.

For comparison with conventional "reflex" constructions, I have illustrated a reflecting mirror in dot-dash lines at 168, mounted for pivotal movement at the same pivot point 167. The dot-dash position shown is the "viewing" position, and the viewing axis established thereby would include the inclined portion $V_5$. The conditions imposed by the requirement that the mirror 168 be long enough to cover the full field of the objective 161 when said objective is racked forward for a close focus (see Fig. 20), plus the requirement of missing the objective mount when the objective 161 is racked back for infinity focus, establish the axis portion $V_5$ at an angle of 88° to the axis $P_2$, i. e., practically 90°, while the axis $V_4$ is readily established at a comfortable viewing angle of 70° (which may be even smaller, if desired). This illustrates the fact that in conventional "reflex" cameras the 90° viewing axis is no mere matter of choice, but rather is an inherent limitation of the structure in most instances.

It will further be appreciated that the auxiliary objective may conveniently be caused to subtend but the central portion of the light cone from the objective 161, rather than the full photographically useful cone as shown in the first form of the invention. In Figs. 19 and 20 the lens 163 subtends a sufficient portion of the cone to give a full field of view at 165, but is no larger than is necessary to do so. This lessens the size of the body which has to be moved aside to permit the production of the photographically useful image and makes it possible to pivot the auxiliary lens structure for rearward movement about a forwardly disposed pivot point, or to mount it in tracks for translatory movement.

Owing to the significant reduction in focal length provided by insertion of the lens 163, the actual "$f$" value of the system is considerably greater during the viewing operation than that of the objective 161 per se. Calculations show that an "$f$" value of 3.5 is established for the image at 162, with the lens 161 wide open, and the "$f$" value of the combined system (for the image at 165) is 2.3, making a very brilliant viewing image. The lens 161 may be stopped down materially, until the stop (indicated at 161a) begins to cut into the marginal rays which pass through the lens 163. In the infinity focus position of the lens 161 (Fig. 19) the lens 161 may be stopped down to about f.7 before the "f" value of the combined system is lowered, and may be stopped down further (to about f.16 or f.18) before the edges of the field will be cut down at the image position 165. In the 6-foot focus position (Fig. 20) the lens 161 may be stopped down to about f.11 before the edges of the field at 165 will be cut off.

Figure 21:
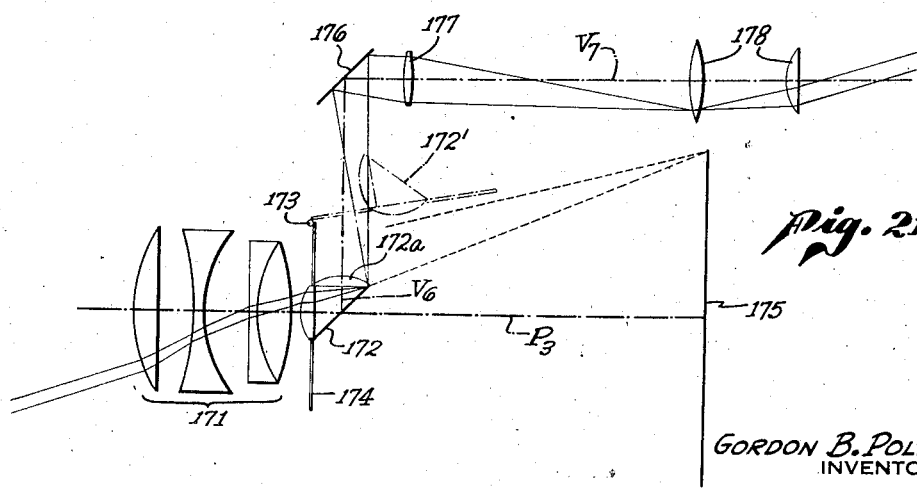
Fig. 21 is a ray tracing showing the application of the invention to a "Tessar" type of objective, wherein an erect and left-to-right correct viewing image is established.

In Fig. 21 I have shown a "Tessar" type of objective 171, a reflector and auxiliary lens assembly 172 rearwardly thereof along a photographic axis $P_3$. The assembly 172 may be mounted for pivotal movement about a pivot point 173 at a position such as shown at 172' in dot-dash lines, and may carry a light guard 174 adapted to shield the photographic register position 175 during the viewing operation in case a focal-plane shutter is not employed. The assembly 172 is adapted to establish an inclined portion $V_6$ of a viewing axis, and a magnifier and reflector assembly of the type shown in Fig. 16 may be employed for viewing, such as a reflector 176, a viewing objective 177, and an ocular 178 disposed along a portion $V_7$ of the viewing axis. In this form the assembly 172 establishes the viewing image in the top lens 172a of the assembly 172, and the lens 177 of the viewing magnifier is in focus at this position.

The subjoined claims define the scope of this invention and I do not choose to be limited to the specific embodiments herein described and delineated in the drawings. For example, those skilled in the art will appreciate the full optical equivalence of reflecting mirrors and refracting prisms to secure the desired deflection of the field of the objecting lens in the production of the viewing image. Furthermore, while I have referred to the production of "images" by the compound objective lens system, in the sense of "real images" actually focused at the focal plane of the ocular system, for example, it will be apparent that "virtual" images may equally well be established in connection with which the optical system of the user's eye must be employed to produce a useful image. Similarly, owing to the power of accommodation of the eye, the focus will not necessarily be produced at the actual focal plane of the ocular system, and for these reasons wherever the term "image" is employed in the subjoined claims, it will be understood as contemplating a "viewable" image, whether "real" or "virtual," in focus at a particular plane or a plane substantially adjacent thereto.

I claim:

1. In a camera construction, the combination which comprises: an objective lens adapted to establish an image at a photographic register position spaced rearwardly therefrom along a photographic axis, said objective lens being adapted for focusing movement to adapt the same to focus at different object distances; means positioned across said axis between said objective lens and said register position for intercepting light rays from said objective lens and directing the same along an axis inclined at an angle to said photographic axis, to define a viewing axis coinciding with the photographic axis between the objective lens and said means and having a portion extending beyond said means and including said inclined axis; and auxiliary lens means disposed along said viewing axis to form with said objective lens a compound objective system cooperating with said first-named means to establish a viewing image at a position rearward of said auxiliary lens means with respect to said objective lens along said viewing axis.

2. In a camera construction, the combination which comprises: an objective lens adapted to establish an image at a photographic register position spaced therefrom along a photographic axis defined by said lens, said objective lens being adapted for focusing movement to adapt the same to focus at different object distances; means positioned across said axis between said objective lens and said register position for intercepting light rays from said objective lens and directing the same along an axis inclined at an angle to said photographic axis, and movable out of said intercepting position, said means being adapted, when in said intercepting position, to define a viewing axis coinciding with the photographic axis between the objective lens and said means and having a portion extending beyond said means and including said inclined axis; auxiliary lens means cooperating with said objective lens to form a compound objective system with a focal length different from the focal length of said objective lens, said auxiliary lens means being so arranged as to be disposed on said viewing axis when said first-named means is in such intercepting position, to cause formation of a viewing image located on said viewing axis at a position rearwardly of said auxiliary lens means with respect to said objective lens, and to be disposed in a position removed from said photographic axis when said first-named means is out of said intercepting position, to permit passage of light rays from said objective lens to said register position; and field lens means disposed on said viewing axis in position to cause said viewing image to be of the "brilliant" type.

3. A construction as set forth in claim 2, said combination including in addition a magnifying lens system disposed on said portion of the viewing axis in position to view said viewing image.

4. In a camera construction, the combination which comprises: an objective lens adapted to establish an image at a photographic register position spaced therefrom along a photographic axis defined by said lens, said objective lens being adapted for focusing movement to adapt the same to focus at different object distances; reflector means disposed across said axis between said objective lens and said register position to intercept light rays from said objective lens and direct the same along an axis inclined at an angle to said photographic axis and thereby to define a viewing axis coinciding with the photographic axis between the objective lens and said reflector means and having a portion extending beyond said means and including said inclined axis, said reflector means being mounted for movement into and out of such intercepting position; an auxiliary objective lens cooperating with said first-named objective lens to form a compound objective system having a focal length different from the focal length of said first-named objective lens, said auxiliary lens being so arranged as to be disposed on said viewing axis when said first-named means is in such intercepting position, to cause formation of a viewing image located on said viewing axis at a position rearwardly of said auxiliary lens means with respect to said objective lens, and to be disposed in a position removed from said photographic axis when said reflector means is out of said intercepting position to permit passage of light rays from said objective lens to said register position; means for moving said reflector means into and out of such intercepting position; and field lens means disposed on said viewing axis in position to cause said viewing image to be of the "brilliant" type.

5. A construction as set forth in claim 4, said auxiliary objective lens means being operatively associated with said reflector means for movement therewith.

6. A construction as set forth in claim 4, said auxiliary objective lens being fixedly mounted upon said inclined axis.

7. A construction as set forth in claim 4, said field lens means being mounted on said inclined axis at the position of said viewing image when said reflector means is disposed in such intercepting position.

8. A construction as set forth in claim 4, and comprising in addition, a focusing member having the characteristics of a photographic "ground glass" mounted on said axis at the position of said viewing image when said reflector means is disposed in such intercepting position.

9. A construction as set forth in claim 4, and comprising in addition, a focusing member having the characteristics of a photographic "ground glass" mounted on said axis at the position of said viewing image when said reflector means is disposed in such intercepting position, said field lens means cooperating with said focusing member, said focusing member being provided with an optically clear area at the position of which a "brilliant" image is produced, and a "ground glass" area providing a focusing zone adjacent said optically clear area.

10. A construction as set forth in claim 4, and comprising in addition, a focusing member having the characteristics of a photographic "ground glass" mounted on said axis at the position of said viewing image when said reflector means is disposed in such intercepting position, said field lens means cooperating with said focusing member, said focusing member being provided with an optically clear central area corresponding in shape and proportional in size to the photographic field of view of said objective lens, and a "ground glass" marginal area providing a focusing zone surrounding said optically clear central area.

11. A construction as set forth in claim 4, said auxiliary lens being disposed between said objective lens and said reflector means when the latter is in such intercepting position, said field lens means being mounted on said inclined axis at the position of said viewing image when said reflector means is disposed in such intercepting position, said auxiliary lens means and said field lens means being operatively associated with and adapted for integral movement with said reflector means.

12. In a camera construction, the combination which comprises: a body structure provided with means defining a photographic register position; an objective lens adapted to establish an image at such photographic register position, said objective lens being mounted on said body structure and spaced from said photographic register position along a photographic axis defined by said lens, and said objective lens being adapted for focusing movement to adapt the same to focus at different object distances; reflector means pivotally mounted on said body structure and movable between (a) a position disposed across said axis between said objective lens and said register position to intercept light rays from said objective lens and direct the same along an axis inclined at an angle to said photographic axis and thereby to define a viewing axis including said inclined axis and coinciding with the photographic axis between the objective lens and said reflector means and (b) a position wholly removed from said photographic axis; auxiliary lens means disposed along said viewing axis and cooperating with said first-named objective lens to form a compound objective system of a focal length different from the focal length of said first-named objective lens, to cause formation of a viewing image located on said inclined axis when said reflector means is disposed in such intercepting position; shutter means interposed between said objective lens and said photographic register position; and means for moving said reflector means between said two positions thereof, said shutter means and said last-named means being mechanically associated to cause operation of said shutter when said reflector means is moved from position (a) to position (b).

13. A construction as set forth in claim 12, said auxiliary objective lens means being operatively associated with said reflector means for movement therewith.

14. In a camera construction, the combination which comprises: an objective lens adapted to establish an image at a photographic register position spaced therefrom along a photographic axis defined by said lens; reflector means disposed across said axis between said objective lens and said register position to intercept light rays from said objective lens and direct the same along an axis inclined at an angle to said photographic axis and thereby to define a viewing axis coinciding with the photographic axis between the objective lens and said reflector means and having a portion extending beyond said means and including said inclined axis, said reflector means being mounted for pivotal movement into and out of such intercepting position; auxiliary objective lens located on said photographic axis between said objective lens and said reflector means, said auxiliary objective lens means cooperating with said first-named objective lens to form a compound objective system having a focal length different from the focal length of said first-named objective lens, said auxiliary lens being so arranged as to be disposed on said viewing axis when said first-named means is in such intercepting position, to cause formation of a viewing image located on said portion of the viewing axis and to be disposed in a position removed from said photographic axis when said reflector means is out of said intercepting position to permit passage of light rays from said objective lens to said register position; and means for moving said reflector means into and out of such intercepting position and for moving said auxiliary objective lens means into and out of position on said viewing axis.

15. In a camera construction, the combination which comprises: an objective lens adapted to establish an image at a photographic register position spaced therefrom along a photographic axis defined by said lens, and said objective lens being adapted for focusing movement to adapt the same to focus at different object distances; means positioned across said axis between said objective lens and said register position for intercepting light rays from said objective lens and directing the same along an axis inclined at an angle to said photographic axis, and movable out of said intercepting position, said means being adapted, when in said intercepting position, to define a viewing axis including said inclined axis and coinciding with the photographic axis between the objective lens and said means; and a positive auxiliary lens means disposed on said viewing axis and cooperating with said objective lens to form a compound objective system with a focal length shorter than the focal length of said objective lens, to cause formation of a viewing image located on said viewing axis at a position rearwardly of said auxiliary lens means with respect to said objective lens when said first-named means is disposed in such intercepting position, and said auxiliary lens means being disposed in a position removed from said photographic axis when said first-named means is out of said intercepting position.

16. A construction as set forth in claim 15, and comprising in addition, a viewing screen of the character of a "ground glass" screen or the like located on said viewing axis at a position corresponding to that of said viewing image established by said compound objective system.

17. A construction as set forth in claim 15, and comprising in addition, a field lens located on said viewing axis at a position corresponding to that of the viewing image established by said compound objective system.

18. A construction as set forth in claim 15, and comprising in addition, a focusing member having the characteristics of a photographic "ground glass" mounted on said axis at the position of said viewing image when said reflector means is disposed in such intercepting position; and a field lens cooperating with said focusing member, said focusing member being provided with an optically clear area at the position of which a "brilliant" image is produced, and a "ground glass" area providing a focusing zone adjacent said optically clear area.

19. A construction as set forth in claim 15, and comprising in addition, a focusing member having the characteristics of a photographic "ground glass" mounted on said axis at the position of said viewing image when said reflector means is disposed in such intercepting position; and a field lens cooperating with said focusing member, said focusing member being provided with an optically clear central area corresponding in shape and proportional in size to the photographic field of view of said objective lens, and a "ground glass" marginal area providing a focusing zone surrounding said optically clear central area.

20. A construction as set forth in claim 15, and comprising in addition, a field lens located on said viewing axis at a position corresponding to that of the viewing image established by said compound objective system, and an eye lens located on said viewing axis in spaced relation to the position of said field lens to cooperate therewith to define an ocular adapted for observation of the viewing image.

21. In a camera construction, the combination which comprises: an objective lens adapted to establish an image at a photographic register position spaced therefrom along a photographic axis defined by said lens; means positioned across said axis between said objective lens and said register position for intercepting light rays from said objective lens and directing the same along an axis inclined at an angle to said photographic axis, and movable out of said intercepting position, said means being adapted, when in said intercepting position, to define a viewing axis coinciding with the photographic axis between the objective lens and said means and having a portion extending beyond said means and including said inclined axis; auxiliary lens means cooperating with said objective lens to form a compound objective system with a focal length different from the focal length of said objective lens, said auxiliary lens means being so arranged as to be disposed on said viewing axis when said first-named means is in such intercepting position, to cause formation of a viewing image located on said portion of the viewing axis, and to be disposed in a position removed from said photographic axis when said first-named means is out of said intercepting position, to permit passage of light rays from said objective lens to said register position; and a viewing lens system of the reversing type positioned for observation of said image and including a reflector member disposed in its optical axis in position to receive said image and invert the same, whereby the resultant viewing image as seen by the eye is erect and left-to-right correct.

22. In a camera construction, the combination which comprises: a body structure provided with means defining a photographic register position; an objective lens adapted to establish an image at such photographic register position, said objective lens being mounted on said body structure and spaced from said photographic register position along a photographic axis defined by said lens; reflector means mounted on said body structure and movable between (a) a position disposed across said axis between said objective lens and said register position to intercept light rays from said objective lens and direct the same along an axis inclined at an angle to said photographic axis and thereby to define a viewing axis including said inclined axis and coinciding with the photographic axis between the objective lens and said reflector means and (b) a position wholly removed from said photographic axis; a positive auxiliary lens means disposed on said viewing axis between said objective lens and said reflector means when the latter is in position (a) and cooperating with said objective lens to form a compound objective system with a focal length shorter than the focal length of said objective lens, to cause formation of a viewing image located on said inclined axis when said reflector means is disposed in such intercepting position; shutter means interposed between said objective lens and said photographic register position; and means for moving said reflector means between said two positions thereof, said shutter means and said last-named means being mechanically associated to cause operation of said shutter when said reflector means is moved from position (a) to position (b).

23. A construction as set forth in claim 22, said auxiliary lens being operatively associated with and adapted for integral movement with said reflector means.

24. A construction as set forth in claim 22, said combination comprising in addition, a field lens mounted on said inclined axis at the position of said viewing image when said reflector means is disposed in such intercepting position, said auxiliary lens means and said field lens being operatively associated with and adapted for integral movement with said reflector means.

25. A construction as set forth in claim 22, and comprising in addition, a focusing member having the characteristics of a photographic "ground glass" mounted on said axis at the position of said viewing image when said reflector means is disposed in such intercepting position; and a field lens cooperating with said focusing member, said focusing member being provided with an optically clear central area corresponding in shape and proportional in size to the photographic field of view of said objective lens, and a "ground glass" marginal area providing a focusing zone surrounding said optically clear central area.

26. A construction as set forth in claim 22, and comprising in addition, a focusing member having the characteristics of a photographic "ground glass" mounted on said axis at the position of said viewing image when said reflector means is disposed in such intercepting position; a field lens cooperating with said focusing member; and an eye lens located on said viewing axis in spaced relation to the position of said field lens to cooperate therewith to define an ocular adapted for observation of the viewing image produced on said focusing member by said compound objective system, said focusing member being provided with an optically clear central area corresponding in shape and proportional in size to the photographic field of view of said objective lens; and a "ground glass" marginal area providing a focusing zone surrounding said optically clear central area.

27. In a camera construction, the combination which comprises: an objective lens adapted to establish an image at a photographic register position spaced therefrom along a photographic axis; means positioned across said axis between said objective lens and said register position for intercepting light rays from said objective lens and directing the same along an axis inclined at an angle to said photographic axis, to define a viewing axis including said inclined axis and coinciding with the photographic axis between the objective lens and said means, and to form a viewing image located on said inclined axis; a focusing member having the characteristics of a photographic "ground glass" mounted on said inclined axis at the position of said viewing image when said reflector means is disposed in such intercepting position; and a field lens cooperating with said focusing member, said focusing member being provided with an optically clear central area corresponding in shape and proportional in size to the photographic field of view of said objective lens, and a "ground glass" marginal area providing a focusing zone surrounding said optically clear central area.

28. In a camera construction, the combination which comprises: an objective lens adapted to establish an image at a photographic register position spaced therefrom along a photographic axis; means positioned across said axis between said objective lens and said register position for intercepting light rays from said objective lens and directing the same along another axis at an angle to said photographic axis, to define a viewing axis including said other axis and coinciding with the photographic axis between the objective lens and said means; a focusing member having the characteristics of a photographic "ground glass" mounted for movement into and out of the position of said viewing image; and a field lens cooperating with said focusing member whereby said viewing image may be viewed as a "ground glass" image when said focusing member is disposed at the position of said image and as a brilliant image when said focusing member is withdrawn from the position of said viewing image.

29. In a camera construction, the combination which comprises: a body structure provided with means defining a photographic register position; an objective lens adapted to establish an image at such photographic register position, said objective lens being mounted on said body structure and spaced from said photographic register position along a photographic axis defined by said lens; a reflex viewing means including reflector means pivotally mounted on said body structure and movable between (a) a position disposed across said axis between said objective lens and said register position to intercept light rays from said objective lens and direct the same along an axis inclined at an angle to said photographic axis and thereby to define a viewing axis including said inclined axis and coinciding with the photographic axis between the objective lens and said reflector means and (b) a position wholly removed from said photographic axis; a film transport structure including rotatable drive means adapted to receive a film spool or the like to which a film may be attached; means for rotating said drive means; a second rotatable drive means operatively associating said first-named drive means with said reflector means and including clutch means adapted to interengage between said second drive means and said reflector means to cause pivotal movement of said reflector means in one rotative direction from position (b) to position (a) upon rotation of said first-named drive means in one direction; detent means constraining said second drive means to rotation in said one rotative direction only and operatively associated with said second drive means and said reflector means to hold said reflector means in said position (a) when said clutch means are interengaged; means biasing said reflector means toward position (b); and release means operatively associated with said second drive means to operatively disassociate said second drive means from said reflector means by disengaging said clutch means, whereby said reflector means is moved from position (a) to position (b) by said biasing means.

30. The method of focusing and determining the field of view of a camera having an objective lens of given focal length and a viewing device cooperating with said objective lens and adapted to produce a "brilliant" type of viewing image, which comprises: inserting an auxiliary objective lens in the angular field of view of said first-named objective lens to create a composite objective lens having a different focal length than said first-named objective lens and therewith produce a viewing image at a plane other than that at which said first-named objective lens is adapted to produce a photographically useful image; examining such viewing image and focusing the camera with relation thereto; and thereafter withdrawing such auxiliary objective lens from the angular field of view of said first-named objective lens when said objective lens is used to produce a photographically useful image.

31. The method of focusing and determining the field of view of a camera having an objective lens of given focal length adapted to produce a photographic image at a photographic register position and a viewing device cooperating with said objective lens and adapted to produce a "brilliant" type of viewing image, which comprises: bringing a reflecting means into the path of light rays passing from said objective lens to direct such light rays along an axis inclined at an angle to said photographic axis and define a viewing axis including said inclined axis and coinciding with the photographic axis between the objective lens and said reflecting means, directing light rays passing from said objective lens along said viewing axis through an auxiliary objective lens means to cause formation of a viewing image by the combined objective lens system at a position other than that at which said objective lens is adapted to produce a photographically useful image; examining such viewing image and focusing the camera with relation thereto; and thereafter withdrawing said reflecting means from said path of light rays when said objective lens is used to produce a photographically useful image.

32. The method of altering the effective "$f$" value of a photographic objective lens during the production of a "brilliant" type viewing image by the use of such lens, which comprises: introducing an auxiliary objective lens into the angular field of view of said first-named objective lens and forming a composite objective lens therewith to establish a viewing image at a viewing position; and removing said auxiliary objective lens from said field of view to produce a photographically useful image with said first-named objective lens, whereby said viewing image is produced at one "$f$" value and said photographically useful image is produced at another "$f$" value.

33. In a camera construction, the combination which comprises: an objective lens adapted to establish an image at a photographic register position spaced rearwardly therefrom along a photographic axis; means positioned across said axis between said objective lens and said register position for intercepting light rays from said objective lens and directing the same along an axis inclined at an angle to said photographic axis, to define a viewing axis coinciding with the photographic axis between the objective lens and said means and having a portion extending beyond said means and including said inclined axis; and auxiliary lens means disposed along said viewing axis to form with said objective lens a compound objective system cooperating with said first-named means to establish a viewing image at a position rearward of said auxiliary lens means with respect to said objective lens along said viewing axis, said auxiliary lens means being of smaller diameter than said objective lens and being positioned to intercept the central bundle of light rays between said objective and said photographic register position.

34. In a camera construction, the combination which comprises: an objective lens adapted to establish an image at a photographic register position spaced rearwardly therefrom along a photographic axis; means positioned across said axis between said objective lens and said register position for intercepting light rays from said objective lens and directing the same along an axis inclined at an angle to said photographic axis which is materially less than 90°, to define a viewing axis coinciding with the photographic axis between the objective lens and said means and having a portion extending beyond said means and including said inclined axis; and auxiliary lens means disposed along said viewing axis to form with said objective lens a compound objective system cooperating with said first-named means to establish a viewing image at a position rearward of said auxiliary lens means with respect to said objective lens along said viewing axis.

GORDON B. POLLOCK.